United States Patent [19]
Pierce et al.

[11] Patent Number: 5,393,096
[45] Date of Patent: Feb. 28, 1995

[54] SUSPENSION FRAME BRACKET

[75] Inventors: William C. Pierce, Muskegon; Gregory T. Galazin, Montague, both of Mich.

[73] Assignee: Nai Neway, Inc., Muskegon, Mich.

[21] Appl. No.: 25,263

[22] Filed: Mar. 2, 1993

[51] Int. Cl.[6] .................. B60G 7/02; B62D 21/11
[52] U.S. Cl. .................... 280/788; 280/713
[58] Field of Search .......... 280/788, 688, 711, 713, 280/725, 683; 248/291; 228/165, 166, 167, 173.3, 173.4, 173.6

[56] References Cited

U.S. PATENT DOCUMENTS

| | | | |
|---|---|---|---|
| 1,247,705 | 11/1917 | Moore | 280/788 |
| 3,482,854 | 12/1969 | Masser | 280/713 |
| 3,773,347 | 11/1973 | Traylor | 280/713 |
| 4,802,690 | 2/1989 | Raidel | 280/713 |
| 5,037,126 | 8/1991 | Gottschalk et al. | 280/713 X |

OTHER PUBLICATIONS

*Metals Handbook*, 8th Edition, vol. 6, "Welding and Brazing", American Society for Metals, 1971, pp. 148–151.

Cary, Howard B., *Modern Welding Technology*, 1979, pp. 501–517.
Blodgett, Omer W., *Design Of Weldments*, 1963, Section 4.7 (pp. 1–6), Section 4.12 (pp. 1–4), and Section 6.2 (pp. 1–10).

*Primary Examiner*—Brian L. Johnson
*Assistant Examiner*—Peter C. English
*Attorney, Agent, or Firm*—Varnum, Riddering, Schmidt & Howlett

[57] ABSTRACT

A frame bracket for mounting a trailing arm to a trailer frame in a trailing arm suspension system comprising a U-shaped frame having a front wall and two side walls, a combined stiffener and gusset having a stiffening portion extending between the U-shaped frame side walls, and a gusset portion extending outwardly from at least one of the U-shaped frame side walls and adapted to mount to the trailer frame to provide additional stiffening, and an attachment flange curving inwardly from an upper edge of at least one of the front and side walls of the U-shaped frame; whereby a weld may be placed between the attachment flange and the trailer frame which is substantially in line with the at least one front or side wall having the attachment flange.

11 Claims, 6 Drawing Sheets

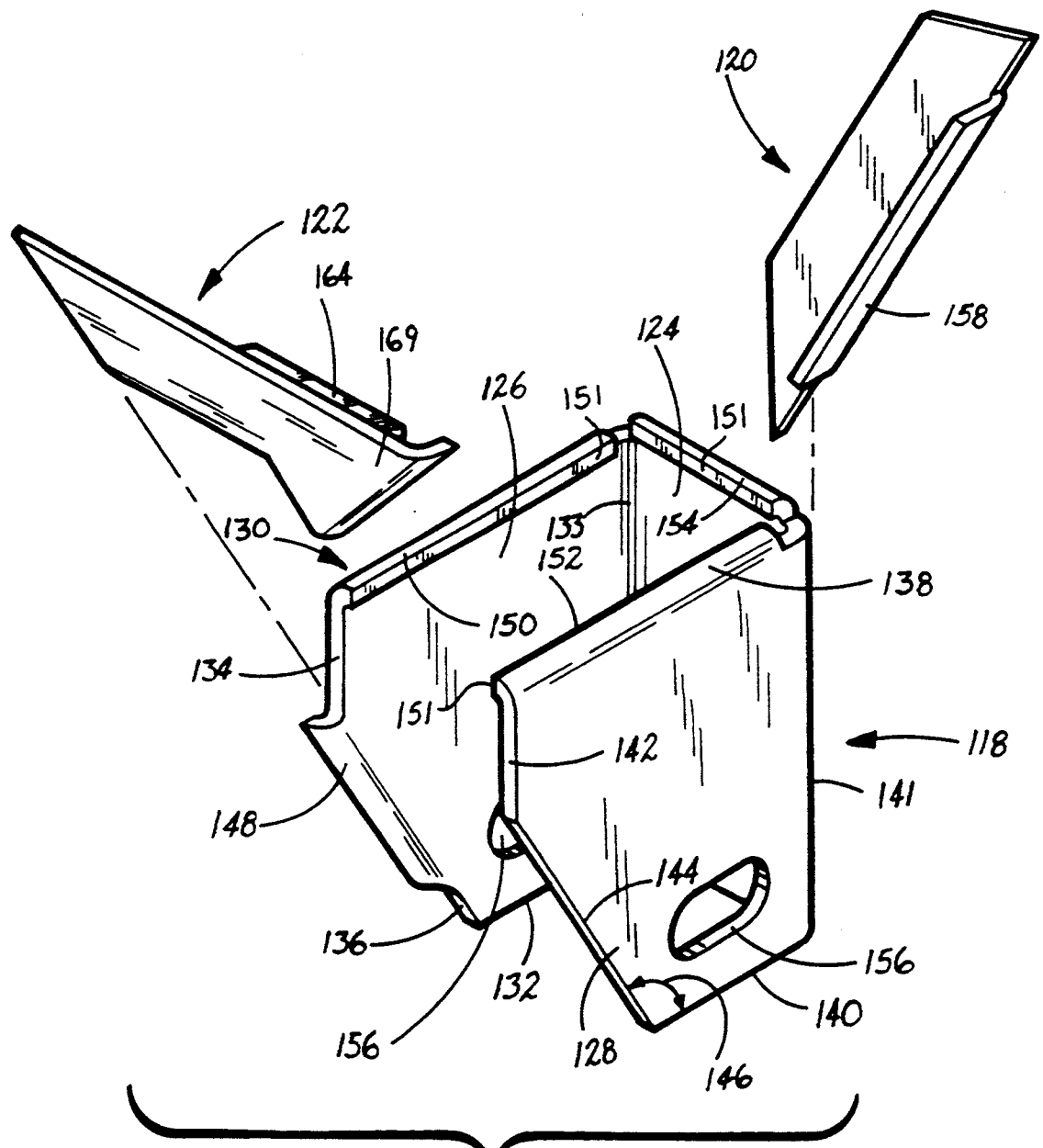

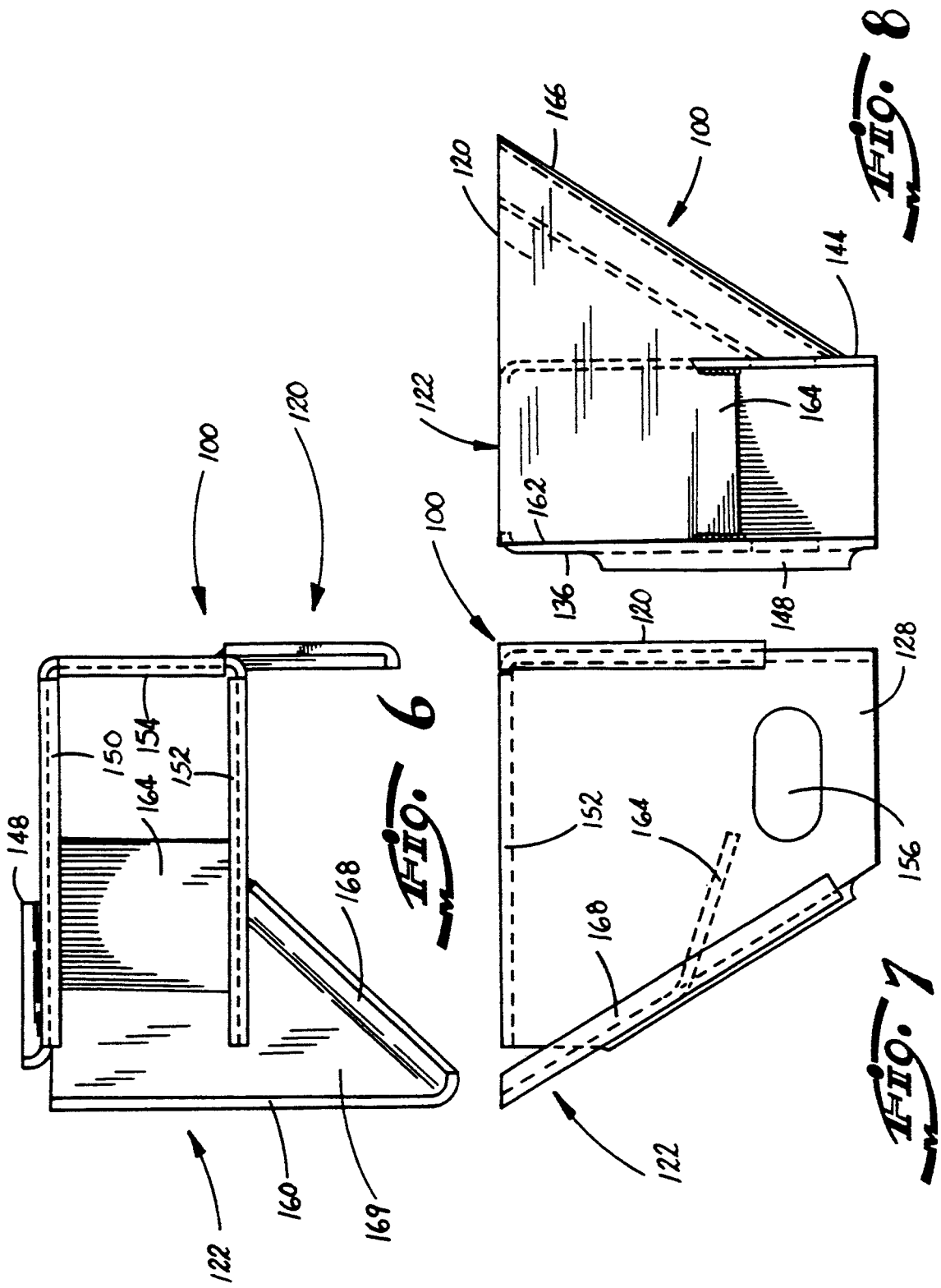

SUSPENSION FRAME BRACKET

BACKGROUND OF THE INVENTION

1. Field of the Invention

The invention relates to vehicle suspensions and, more particularly, to mounting brackets for mounting a trailing arm in a trailing arm suspension system to a vehicle frame.

2. State of the Prior Art

A typical suspension system for a heavy duty vehicle, such as a semitrailer, comprises a mounting bracket mounted to the underside of the vehicle frame, a trailing arm pivotably mounted to the bracket and extending rearwardly, an air spring mounted between the rear end of the trailing arm and the frame, and an axle mounted to the trailing arm intermediate the air spring and the bracket.

A typical prior art mounting bracket and its attachment to a vehicle frame are shown in FIGS. 1 through 3. The bracket 10 comprises a U-shaped side frame 12, a U-shaped top plate insert 14, and front and rear gussets 16 and 18. When the bracket 10 is mounted to a vehicle frame, it depends therefrom such that the side walls 13a, 13b of the side frame 12 are oriented vertically and its open end 15 faces rearwardly. A portion of the rear edges 20 of the side frame 12 slopes forwardly and has outwardly extending flanges 21 to provide added stiffness to the sidewalls 13a, 13b of the side frame 12. The top plate insert 14 fits within the side frame 12 to further stiffen the bracket 10. The top plate insert 14 comprises a top panel 22 which fits tightly within the U-shaped frame 12 at its upper edges, a vertical panel 24 extending downwardly from the top panel 22, thereby enclosing a portion of the open rear of the side frame 12, and an angled panel 26, sloping forwardly within the side :frame 12. The edges of the top plate insert 14 are typically welded to the surfaces of the side frame 12. The front and rear gussets 16 and 18 extend outwardly from the U-shaped frame 12 at its front and rear, respectively, and angle upwardly to be rigidly secured to the vehicle frame and thereby brace the bracket 10. Holes 28 in both sides of the side frame 12 near its lower edge are adapted to receive a pin for rotatably mounting the trailing arm. The upper edges of the side frame 12 and the front and rear gussets 16 and 18 are further secured to the vehicle frame by welding.

Turning now more particularly to FIG. 2, the top panel 22 of the top plate insert 15 is frequently elevated above the upper edges of the side frame 12. A fillet weld 30 permanently affixes an edge of the top panel 22 to a corresponding edge of the side frame 12. The weld 30 is often uneven and must be ground after assembly to render it smooth and flush with the top panel 22. Typically, the bracket 10 is separately assembled in a fixture and attachment of the bracket 10 to a vehicle frame 32 comprises a second operation wherein an additional fill-in weld 34 secures the first weld 30 and the top panel 22 to the vehicle frame 32. In some cases, where the top panel 22 is flush with the top edges of the side frame 12 or, as in FIG. 3, the top panel is altogether missing, the upper edge of the side frame 12 abuts the vehicle frame 32 directly and fillet weld 36 secures them together. Fabrication of trailing arm suspension systems as in FIG. 2 requires at least two assembly operations, four parts, and intense labor just to manufacture a mounting bracket. There is a continuing need for lower manufacturing costs, higher strength, and lower weight in vehicle trailing arm suspensions.

SUMMARY OF THE INVENTION

The present invention overcomes these limitations in the prior art and provides a sturdy frame bracket requiring fewer parts and welds. The present invention also aligns more accurately the weld between the frame bracket and the trailer frame with the frame bracket than prior frame brackets without a top plate. The invention also reduces the moment about the weld and distributes strain evenly along the weld.

In one aspect of the invention, a mounting bracket assembly for mounting a trailing arm to a vehicle frame in a trailing arm suspension system comprises a side frame having a front plate and two side plates extending substantially parallel to each other from the front plate. A front gusset is adapted to be securely fixed between the front plate and a vehicle frame. The assembly further comprises a one-piece rear gusset having a brace portion and a stiffening portion. The stiffening portion extends obliquely from the brace portion and is sized to fit between the side plates and be welded thereto. The brace portion has a side edge adapted to be secured to one of the side plates and a top edge adapted to be secured to the vehicle frame.

Preferably, at least one of the front and side plates of the side frame has an attachment flange with a curved portion extending from an upper edge thereof. The attachment flange is adapted to abut a vehicle frame with a gap between the curved portion and the vehicle frame with a weld filling the gap. One or both of the side plates can have a lower edge substantially parallel to, and shorter than, its corresponding upper edge. Preferably, one of the plates has a stiffening flange extending therefrom between the upper and lower edges.

In a further aspect of the invention, a vehicle frame has a mounting bracket for mounting a trailing arm suspension. The mounting bracket comprises a front plate and two substantially parallel side plates. Each of the front and side plates has upper edges welded to the vehicle frame. Bracing means brace the mounting bracket against lateral stresses. An attachment flange, having a curved portion, extends from at least one of the upper edges. A gap is provided between the curved portion and the vehicle frame, and the curved portion is secured to the vehicle frame by a weld in the gap.

The bracing means preferably comprises a rear gusset having a stiffener portion and a brace portion. The stiffener portion extends obliquely from the brace portion and between the side plates, and is welded thereto. The brace portion extends away from one of the side plates and is welded to the vehicle frame.

BRIEF DESCRIPTION OF THE DRAWINGS

The invention will now be described with reference to the accompanying drawings in which:

FIG. 5 is an exploded perspective view of the mounting bracket of FIG. 4;

FIG. 6 is a plan view of the mounting bracket of FIG. 4;

FIG. 7 is a side elevation of the mounting bracket of FIG. 4;

FIG. 8 is rear elevation of the mounting bracket of FIG. 4; and

DETAILED DESCRIPTION OF THE DRAWINGS

Figure 1:
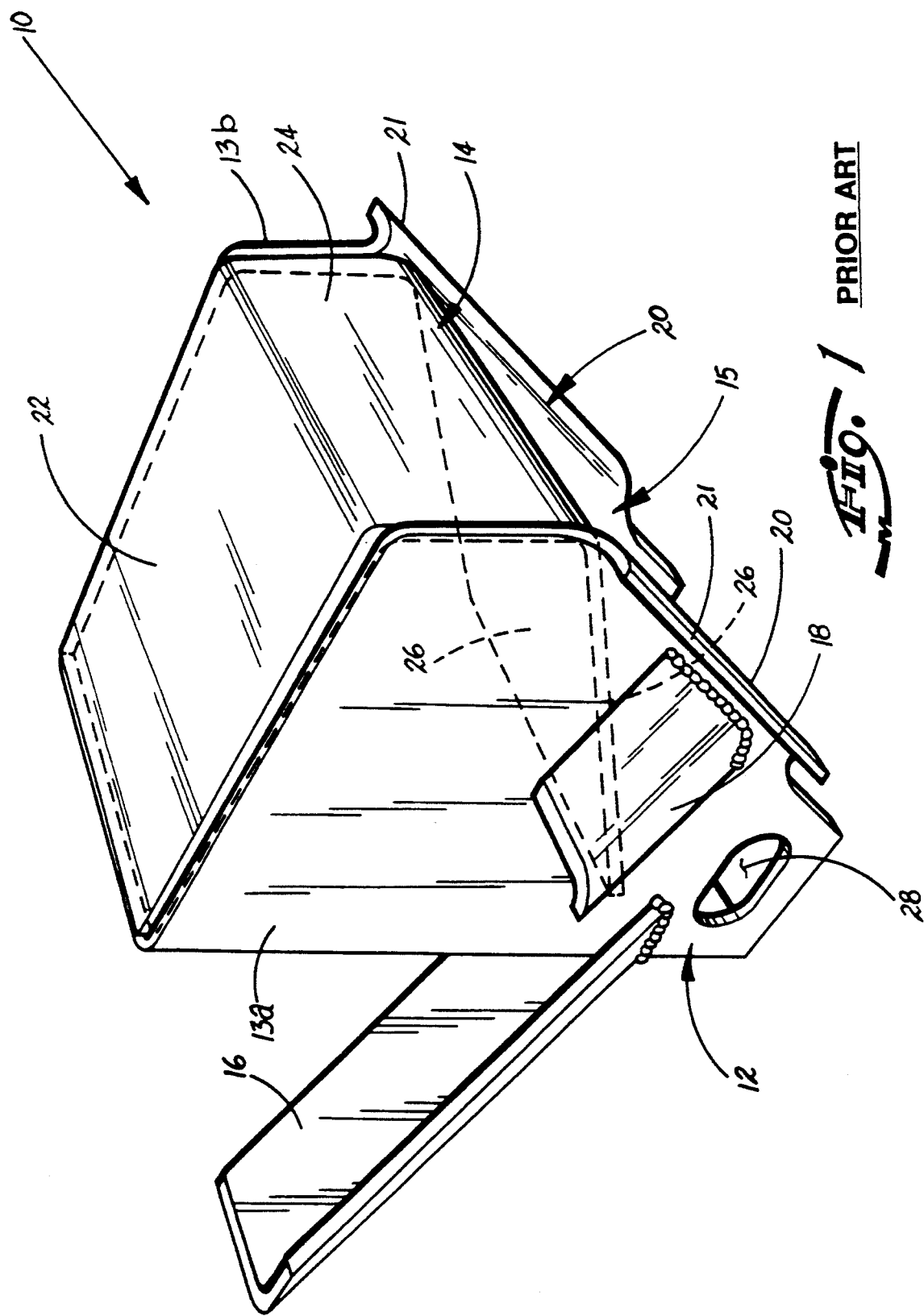
FIG. 1 is a perspective view of a prior art mounting bracket for a trailing arm suspension.
Figure 3:
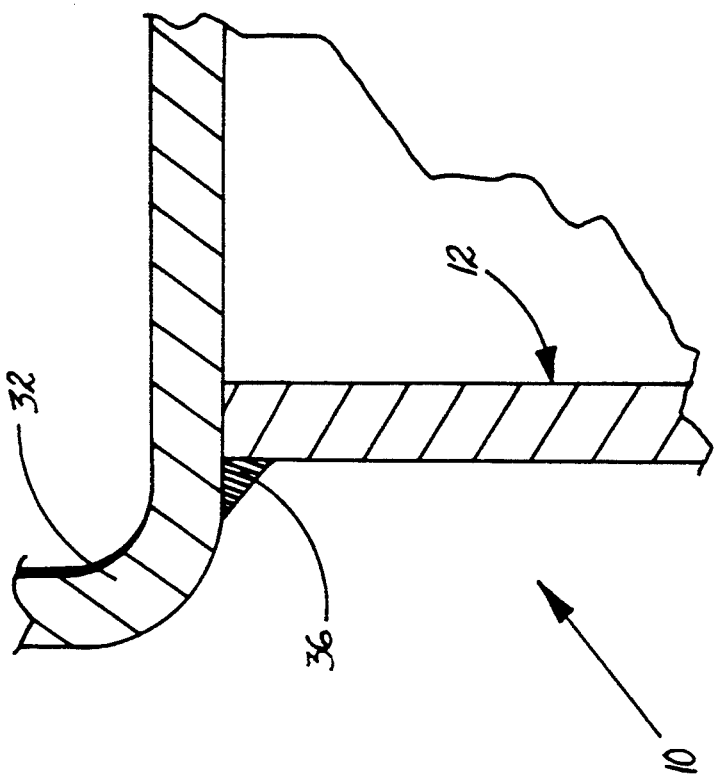
FIG. 3 is a sectional elevation of a portion of a prior art mounting bracket, without a top plate, mounted to a vehicle frame.
Figure 2:
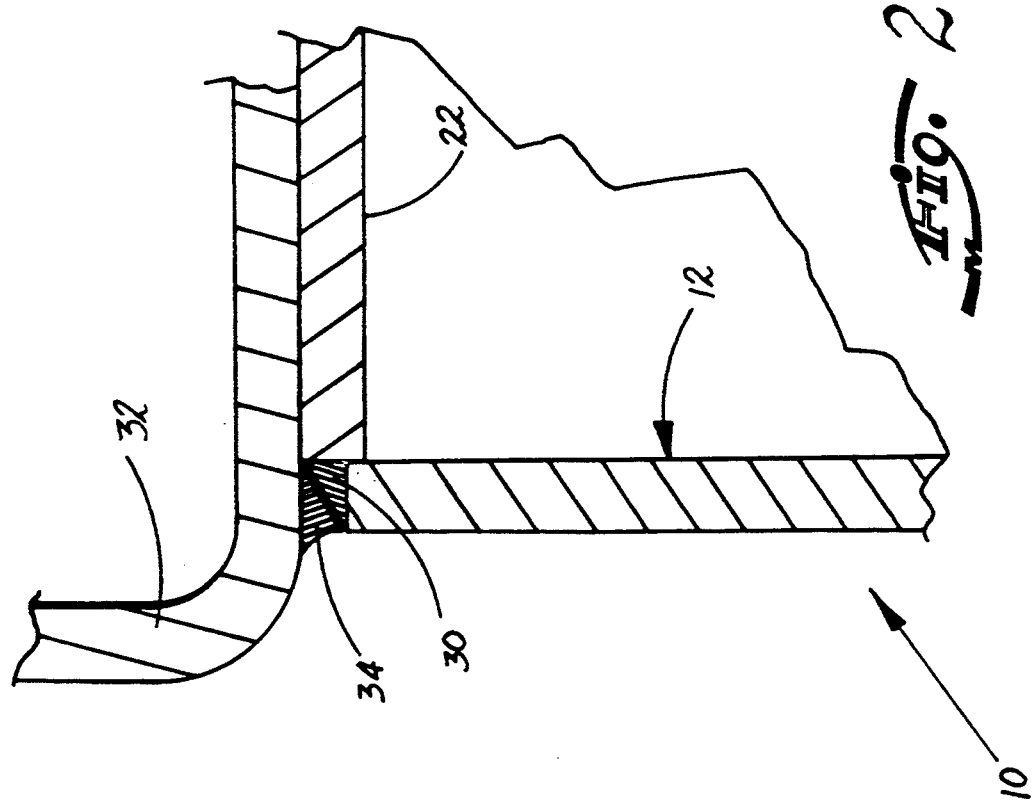
FIG. 2 is a sectional elevation of a portion of a prior art mounting bracket with a top plate mounted to a vehicle frame.

Referring again to the drawings, and to FIG. 4 in particular, an improved trailing arm mounting bracket 100 is shown mounted to the underside of a vehicle frame 110. It is adapted to pivotably mount a conventional trailing arm 112 (shown in phantom) which is typically supported at its rear end by an air spring 114 (shown in phantom), and which carries an axle 116 for the vehicle. Turning now also to FIG. 5, it will be seen that the mounting bracket 100 comprises only three parts: a side frame 118, a front gusset 120, and a rear gusset 122.

The side frame 118 comprises a front plate 124, and two side plates 126, 128 extending substantially parallel to each other from the front plate 124. Depending upon the side of the vehicle to which the bracket 100 is mounted, one of the side plates will be outer and the other will be inner, relative to the vehicle. In the illustrated embodiment of FIG. 4, the bracket is mounted on the left side of the vehicle so that the plate 126 is the outer side plate, and the plate 128 is the inner side plate. The outer side plate 126 comprises an upper edge 130, a lower edge 132, a front end 133, a rear edge 134, and a sloped edge 136. The inner side plate 128 similarly comprises an upper edge 138, a lower edge 140, a front end 141, a rear edge 142, and a sloped edge 144.

For the inner side plate, the upper and lower edges 138 and 140 are substantially parallel to each other, and the rear edge 142 extends normally from the upper edge 138 a short distance. The sloped edge 144 slopes from the rear edge 142 to intersect the bottom edge 140. The angle 146 thus formed between the sloped edge 144 and the bottom edge 140 is approximately 125 degrees.

The outer side plate 126 has generally the same configuration as the inner side plate 128, and further comprises a stiffening flange 148 extending normally, outwardly from the outer surface of the outer side plate 126. It provides added stiffness to resist buckling of the outer side plate 126. Attachment flanges 150, 152, and 154 extend inwardly from, and normal to, the upper edge 130 of the outer side plate 126, the upper edge 138 of the inner side plate 128, and the upper edge of the front plate 124, respectively. Each of the attachment flanges 150, 152, 154 terminate in a terminal edge 151 adjacent the respective side plates and front plate 126, 128, 124. The function of the attachment flanges 150, 152, and 154 will be more fully explained hereinafter. The side plates 126, 128 have aligned elongated holes 156 for mounting a trailing arm 112 (see FIG. 4) in a conventional manner.

The front and rear gussets 120 and 122 brace the frame bracket 100 against lateral stresses. The front gusset 120 is generally trapezoidal in shape and further comprises a stiffening flange 158 along the longer edge for added strength. It attaches to the side frame 118 by welding.

The rear gusset 122 is formed of one piece of metal and comprises both a brace portion 169 for providing lateral stability to the overall frame bracket 100, and a stiffener portion 164 for stiffening the side frame 118. The stiffener portion 164 extends obliquely from the brace portion 169. The rear gusset structure is more clearly seen in FIG. 4. It has an upper edge 160, which lies roughly in the same plane as the upper edges 130, 138 when the rear gusset 122 is mounted to the side frame 118 (see also FIG. 7). The rear gusset 122 also comprises an outside edge and an interior edge 163 facing the side frame 118, perpendicular to the upper edge 160. When the rear gusset 122 is mounted to the side frame 118, the outside edge 162 abuts and aligns with the sloped edge 136 on the outer plate 126 and the interior edge 163 aligns with and is welded to the sloped edge 144 on the inner side plate 128. In other words, the bulk of the rear gusset 122 is oriented relative to the vehicle frame at the same angle as the sloped rear edges 136, 144 of the side frame 118.

The stiffener portion 164, being oblique to the rest of the rear gusset 122, thus lies between the outer and inner side plates 126, 128 (see also FIGS. 6 through 8). It is sized to fit snugly between the side plates 126, 128 so the edges thereof can be welded to the side plates 126, 128. An inside edge 166 of the rear gusset 122 extends from the upper edge 160 at roughly a 45-degree angle to intersect its interior edge 163 and the inner side plate sloped rear edge 144, to define a brace outer portion 167 between the interior edge 163 and the inside edge 166. A stiffening flange 168 extends normal to the rear gusset 122 along its inside edge 166. The rear gusset 122 is also welded to the inner side plate 128 along its angled edge 144. That portion of the rear gusset 122 which extends between the interior edge 163 and the inside edge 166 extends inwardly beyond the side plate 128.

Figure 4:
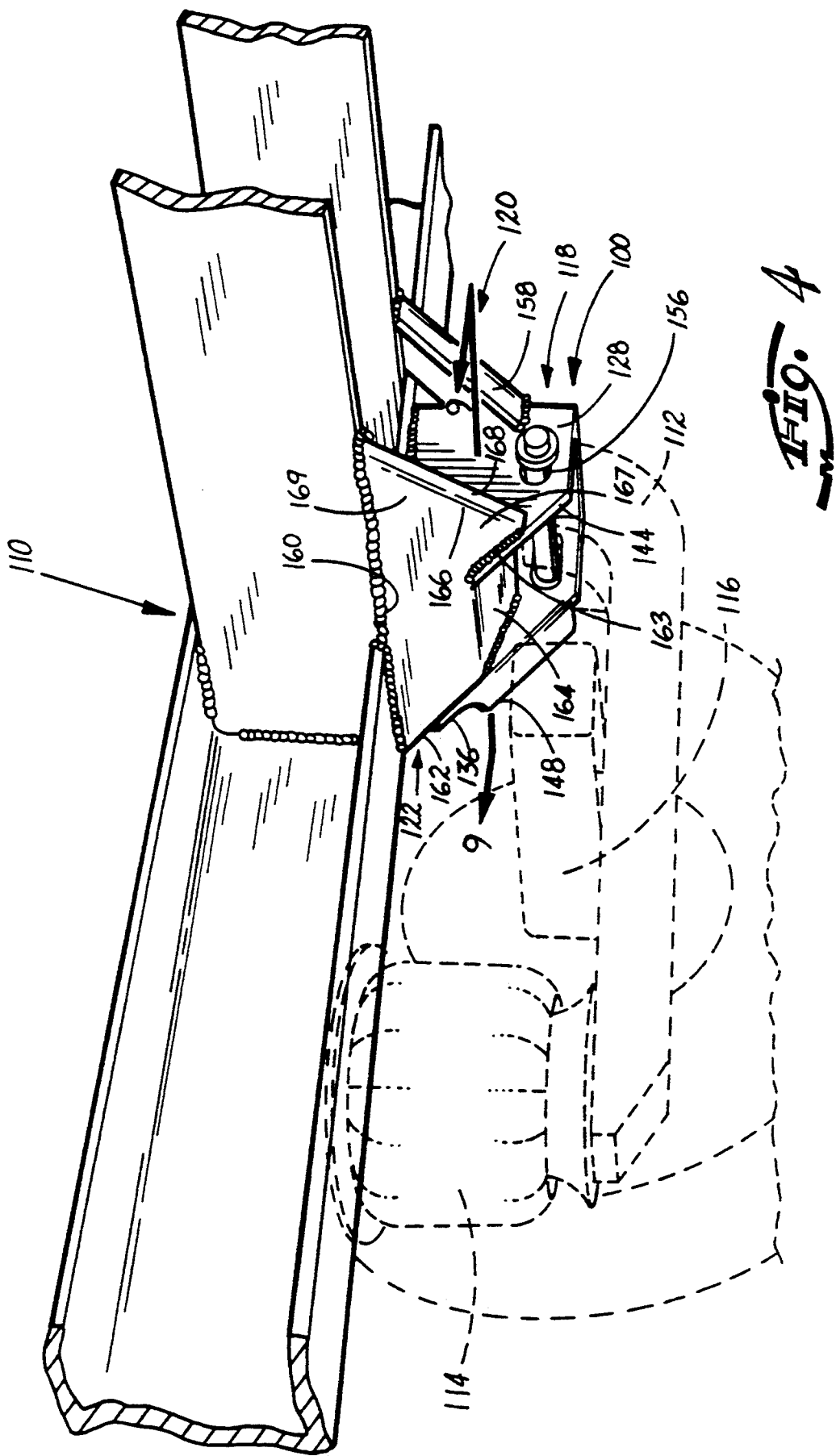
FIG. 4 is a right side rear perspective view of a mounting bracket according to the invention, secured to a vehicle frame.

The attachment of the front gusset 120 is also illustrated in FIG. 4. The front gusset 120 is welded to the front plate 124 of the side frame 118, and its stiffening flange 158 is welded to the inner side plate 128 (see also FIG. 6). The front gusset 120 extends inwardly and upwardly to meet the vehicle frame 110 at an approximately 45-degree angle. The front and rear gussets 120 and 122 are securely welded to the vehicle frame 110, and thus provide lateral support for the frame bracket 100.

Figure 9:
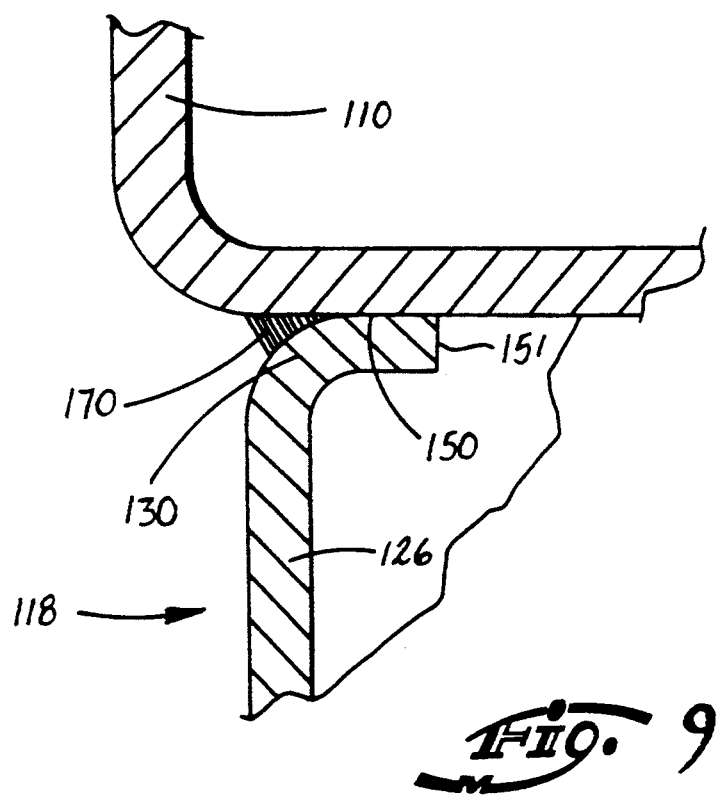
FIG. 9 is a sectional elevation of a portion of the mounting bracket of the invention mounted to a frame and taken along lines 9-9 of FIG. 4.

FIG. 9 illustrates the attachment of the side frame 118 to the vehicle frame 110 by way of the connection between the outer side plate 126 and the vehicle frame 110. The inner side plate 128 and front plate 124 are attached similarly to the vehicle frame 110. It can be seen that the attachment flange 150 is formed by bending the material of the outer side plate 126 inwardly at its upper edge 130, so that the attachment flange 150 curves inwardly from the outer side plate 126. Thus, when the attachment flange 150 of the outer side plate 126 abuts the vehicle frame 110, the curve in the attachment flange 150 provides a gap between the upper edge 130 of the outer side plate 126 and the vehicle frame 110. A weld 170 fills the gap and thus lies essentially in the same vertical plane as the outer side plate 126. It has been found that this structure greatly reduces any moment about the weld 170 and minimizes uneven strain distribution through the weld 170. The remaining attachment flanges 152, 154 are attached to the vehicle frame 110 in a similar fashion.

It will be evident that the mounting bracket 100 of the present invention comprises fewer parts and is thus easier and less costly to manufacture than prior mounting brackets. The mounting bracket 100 includes only three parts which are preferably stamped and formed from plate steel. A typical embodiment would be made of SAE-950 steel having a thickness of 0.25 inches. The mounting bracket 100 is thus lighter and less costly to produce than prior mounting brackets containing four parts. Further, its structure provides a stronger connection to a vehicle frame.

Reasonable variation and modification are possible within the scope of the foregoing disclosure and drawings without departing from the spirit of the invention, as defined in the accompanying claims.

The embodiments of the invention in which an exclusive property or privilege is claimed are as follows:

1. A mounting bracket assembly for mounting a trailing arm to a vehicle frame in a trailing arm suspension system, the mounting bracket assembly comprising:
    a side frame having a front plate and two side plates extending substantially parallel to each other from the front plate; and
    a one-piece rear gusset having a brace portion and a stiffening portion, the stiffening portion extending obliquely from the brace portion and sized to fit in a space between the side plates and welded thereto, and the brace portion having a laterally extending portion extending laterally of the space between the side plates, said laterally extending portion of said brace portion having an interior edge extending along one of said side plates and being secured thereto, and a top edge adapted to be secured to the vehicle frame wherein said brace portion laterally extending portion extends laterally of said one of said side plates and extends between said one of said side plates and said vehicle frame when the mounting bracket assembly is assembled to the vehicle frame.

2. A mounting bracket assembly according to claim 1 wherein at least one of the front and side plates of the side frame has an attachment flange comprising a curved portion extending from an upper edge thereof, said attachment flange adapted to abut the vehicle frame with a gap between the curved portion and the vehicle frame, whereby to receive a weld in the gap.

3. A mounting bracket assembly according to claim 2 wherein at least one of the side plates has a lower edge substantially parallel to an upper edge, the lower edge being shorter than the upper edge.

4. A mounting bracket assembly according to claim 3 wherein each side plate has a lower edge substantially parallel to a respective upper edge, each lower edge further being shorter than the respective upper edge, and one of the side plates has a stiffening flange extending therefrom between the upper and lower edges.

5. A mounting bracket assembly according to claim 3 wherein the at least one side plate has a rear edge between the lower edge and the upper edge extending at a first angle relative to the lower edge, and the stiffening portion extends obliquely from the brace portion at a second angle more acute than the first angle.

6. A mounting bracket assembly according to claim 2 wherein each side plate has a lower edge substantially parallel to a respective upper edge, each lower edge further being shorter than the respective upper edge, and one of the side plates has a stiffening flange extending therefrom between the upper and lower edges.

7. A mounting bracket assembly according to claim 1 wherein at least one of the side plates has a lower edge substantially parallel to an upper edge, the lower edge being shorter than the upper edge.

8. A mounting bracket assembly according to claim 1 wherein each side plate has a lower edge substantially parallel to a respective upper edge, each lower edge further being shorter than the respective upper edge, and one of the side plates has a stiffening flange extending therefrom between the upper and lower edges.

9. A mounting bracket assembly according to claim 1 and further comprising a front gusset affixed to one of the side plates adjacent the front plate, the front gusset extending laterally thereof and adapted to be affixed to the vehicle frame at a location laterally outside of the one of said side plates.

10. A vehicle suspension having a mounting bracket mounting a trailing arm suspension to a vehicle frame, said mounting bracket comprising a front plate and two side plates extending substantially parallel to each other from the front plate, each of said front and side plates welded directly at upper portions thereof to the vehicle frame without a panel therebetween, the improvement comprising:
    at least one of said front and side plates being deformed laterally at an upper portion thereof and terminating in a terminal edge adjacent a side of said at least one plate to form a gap between an outer surface of the deformed portion and the vehicle frame;
    the deformed portion being secured to the vehicle frame by a weld in the gap, the weld being disposed above the at least one plate wherein moments about said weld between said at least one plate and said frame due to vertical loads on the mounting bracket are minimized; and
    a rear gusset having a stiffener portion and a brace portion, said stiffener portion extending obliquely from the brace portion and between the side plates, and welded thereto, said brace portion extending away from one of the side plates and having a portion thereof welded to the vehicle frame.

11. A vehicle frame according to claim 10 wherein each of the side plates has a lower edge shorter than the respective upper edge, and a rear edge extending at an angle from the lower edge so that the lower edges lie in a single plane, and wherein the brace portion is substantially parallel to the plane.

* * * * *